United States Patent
Hamilton, II et al.

(10) Patent No.: US 8,671,198 B2
(45) Date of Patent: Mar. 11, 2014

(54) RESOURCE ACQUISITION AND MANIPULATION FROM WITHIN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 12/131,581

(22) Filed: Jun. 2, 2008

(65) Prior Publication Data

US 2009/0300639 A1     Dec. 3, 2009

(51) Int. Cl.
*G06F 15/173*     (2006.01)
*G06F 3/048*     (2013.01)

(52) U.S. Cl.
USPC ........................................ 709/226; 715/757

(58) Field of Classification Search
USPC ............................. 709/226; 715/757; 718/104
See application file for complete search history.

(56) References Cited

U.S. PATENT DOCUMENTS

| | | | |
|---|---|---|---|
| 6,119,147 A | 9/2000 | Toomey et al. | |
| 6,381,613 B1 | 4/2002 | Gallery et al. | |
| 6,421,047 B1 | 7/2002 | de Groot | |
| 6,493,001 B1 | 12/2002 | Takagi et al. | |
| 6,549,933 B1 | 4/2003 | Barrett et al. | |
| 6,772,195 B1 | 8/2004 | Hatlelid et al. | |
| 7,084,876 B1 | 8/2006 | Fogel et al. | |
| 7,115,034 B2 | 10/2006 | Kuwahara | |
| 8,161,397 B2 | 4/2012 | Kalasapur et al. | |
| 2002/0054129 A1 | 5/2002 | Heron et al. | |
| 2002/0113820 A1 | 8/2002 | Robinson et al. | |
| 2003/0014423 A1 | 1/2003 | Chuah et al. | |
| 2003/0054882 A1 | 3/2003 | Suzuki | |
| 2004/0266505 A1* | 12/2004 | Keam et al. | 463/1 |
| 2005/0086612 A1 | 4/2005 | Gettman et al. | |
| 2005/0117215 A1 | 6/2005 | Lange | |
| 2005/0137015 A1 | 6/2005 | Rogers et al. | |
| 2005/0140668 A1 | 6/2005 | Hlavac et al. | |
| 2006/0136964 A1 | 6/2006 | Diez et al. | |
| 2006/0178968 A1 | 8/2006 | Jung et al. | |
| 2007/0035561 A1 | 2/2007 | Bachelder et al. | |
| 2007/0132752 A1 | 6/2007 | Stacy | |
| 2008/0065514 A1* | 3/2008 | Eaton | 705/27 |
| 2008/0141147 A1 | 6/2008 | Buhrke et al. | |
| 2009/0083051 A1 | 3/2009 | Bokor et al. | |

(Continued)

OTHER PUBLICATIONS

Hamilton II et al., U.S. Appl. No. 12/120,791, filed May 15, 2008, Office Communication dated Apr. 19, 2010, 15 pages.

(Continued)

*Primary Examiner* — David X Yi
(74) *Attorney, Agent, or Firm* — Lisa Ulrich; Hoffman Warnick LLC

(57) ABSTRACT

The present invention is directed to a system, method and program product that allows a user to access resources on a local computer during a session with a virtual universe. Disclosed is a system that obtains an inventory of resources from the client computer and generates renderings of the resources in the virtual universe. Also included is a resource interaction system for allowing an avatar to interact with the resources in the virtual universe, wherein the resource interaction system provides a transport facility for loading resources from the client computer to the virtual universe.

8 Claims, 3 Drawing Sheets

(56) References Cited

U.S. PATENT DOCUMENTS

| | | |
|---|---|---|
| 2009/0083501 A1 | 3/2009 | Friauf et al. |
| 2009/0089685 A1 | 4/2009 | Mordecai et al. |
| 2009/0106347 A1 | 4/2009 | Harwood et al. |
| 2009/0106671 A1 | 4/2009 | Olson et al. |
| 2009/0165140 A1 | 6/2009 | Robinson et al. |
| 2009/0210483 A1 | 8/2009 | Pierce et al. |
| 2009/0227368 A1 | 9/2009 | Wyatt |
| 2009/0249244 A1 | 10/2009 | Robinson et al. |
| 2009/0271422 A1 | 10/2009 | Finn et al. |
| 2010/0030578 A1 | 2/2010 | Siddique et al. |

OTHER PUBLICATIONS

Project Looking Glass by Sun Microsystems: Open Platform to Explore Innovative 3D User Interface, http://www.sun.com/software/looking_glass/, retrieved from the World Wide Web Mar. 19, 2008.

FAQs From Croquet Consortiun, http://www.croquetproject.org?index.php/FAQs, retrieved from the World Wide Web Mar. 19, 2008.

Waqas, Office Action Communication for U.S. Appl. No. 12/134,850 dated Feb. 2, 2011, 21 pages.

Waqas, U.S. Appl. No. 12/134,850, Office Action Communication, Oct. 28, 2011, 21 Pages.

Yl, Office Communication for U.S. Appl. No. 12/120,791 dated Oct. 8, 2010, 19 pages.

Waqas, Office Communication for U.S. Appl. No. 12/134,960 dated Sep. 1, 2010, 23 pages.

Waqas, U.S. Appl. No. 12/134,850, Office Action Communication, Feb. 14, 2012, 26 pages.

Waqas, U.S. Appl. No. 12/134,850, Office Action Communication, Jun. 19, 2012, 31 Pages.

Waqas: U.S. Appl. No. 12/134,850, Final Office Action, Nov. 28, 2012, 34 pg.

Yi, U.S. Appl. No. 12/120,791, Notice of Allowance & Fees Due, Jul. 10, 2013, 32 pages.

\* cited by examiner

RESOURCE ACQUISITION AND MANIPULATION FROM WITHIN A VIRTUAL UNIVERSE

FIELD OF THE INVENTION

The present invention relates to virtual universes, and more specifically relates to a system, method and program product for providing a virtual universe in which a user can access resources on a client computer from within the virtual universe.

BACKGROUND OF THE INVENTION

A virtual universe is an interactive simulated environment accessed by multiple users through an online interface. Users inhabit and interact in the virtual universe via avatars, which are two or three-dimensional graphical representations of humanoids. There are many different types of virtual universes, however there are several features many virtual universes generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual universes (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual universes present a tremendous new outlet for both structured and unstructured virtual collaboration, gaming and exploration, as well as real-life simulations in virtual spaces. These activities, along with yet to be disclosed new dimensions, in turn provide a wide open arena for creative and new communication methods and mechanisms.

As virtual universes become more involved, there may be occasions when it becomes desirable to access client computer resources (e.g., files, programs, media, etc.) from within the virtual universe. For example, an avatar may wish to add a program to its inventory that performs some function for the avatar. Current approaches do not provide an effective mechanism for achieving this task. In view of the foregoing, there exists a need for an approach that addresses at least one of the deficiencies of the related art.

SUMMARY OF THE INVENTION

The present invention provides a system for accessing resources on a client computer from within a virtual universe. The invention allows interaction with resources, such as files, images, programs, business documents, etc., during a virtual universe session. Resources can also be transported by avatar control into the virtual universe from the client computer so they may be utilized or otherwise manipulated from within the virtual universe.

A first aspect of the present invention is directed to a system for accessing resources on a client computer from within a virtual universe, comprising: a system for obtaining an inventory of resources from the client computer and generating renderings of the resources in the virtual universe; and a resource interaction system for allowing an avatar to interact with the resources in the virtual universe, wherein the resource interaction system provides a transport facility for loading resources from the client computer to the virtual universe.

A second aspect of the present invention is directed to a method for accessing resources on a client computer from within a virtual universe, comprising: obtaining an inventory of resources from the client computer; generating renderings of the resources in the virtual universe; and displaying an interface through which an avatar can interact with the resources in the virtual universe, wherein the interface provides a transport facility for loading resources from the client computer to the virtual universe.

A third aspect of the present invention is directed to a program product stored on a computer readable medium for accessing resources on a client computer from within a virtual universe, comprising: program code for obtaining an inventory of resources from the client computer; program code for generating renderings of the resources in the virtual universe; and program code for displaying an interface through which an avatar can interact with the resources in the virtual universe, wherein the interface provides a transport facility for loading resources from the client computer to the virtual universe.

A fourth aspect of the present invention is directed to a method for deploying an application for accessing resources on a client computer from within a virtual universe, comprising: providing a computer infrastructure being operable to: obtain an inventory of resources from the client computer; generate renderings of the resources in the virtual universe; and display an interface through which an avatar can interact with the resources in the virtual universe, wherein the interface provides a transport facility for loading resources from the client computer to the virtual universe.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
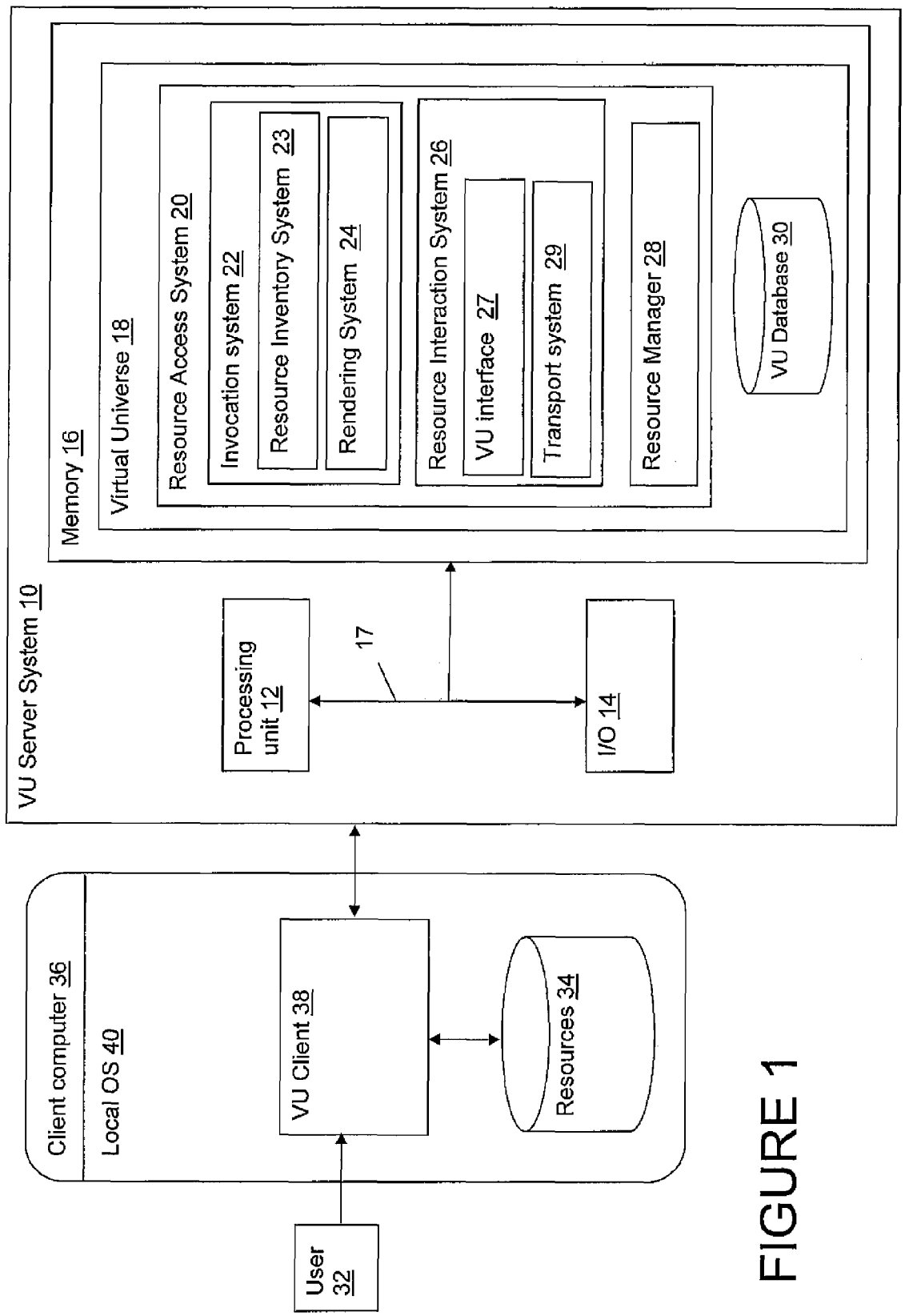
FIG. 1 depicts a virtual universe computing platform in accordance with an embodiment of the present invention.

Referring now to the drawings, FIG. 1 depicts a virtual universe infrastructure that includes a virtual universe (VU) server system 10 for implementing and serving a virtual universe 18 over a network, and a client computer system 36 for providing access for a user 32 to the virtual universe 18. In general, user 32 accesses virtual universe 18 from a virtual universe (VU) client 38. Client computer 36 may comprise any type of computing device, e.g., a personal computer, a laptop, a handheld device, etc., that provides a local operating system (OS) 40 from which resources 34 associated with the client computer 36 can be accessed. Local OS 40 may comprise any type of now known or later developed operating system.

Within virtual universe 18 is a resource access system 20 that allows a user's avatar participating in virtual universe 18 to interact with (i.e., explore, view, modify, run, transport, etc.) resources 34 from client computer 36. Resource access system 20 provides a facility that renders representations of the client computer's resources 34 within the virtual universe 18 so that the user's avatar can interact with resources 34. If desired, resources 34 from the client computer 36 can be transported via the user's avatar from the client computer into the virtual universe 18 (and vice versa). Virtually any type of resource 34 associated with the client computer 36 can be accessed via this process. Illustrative resources 34 include, but are not limited to, disk drives, CD-ROMs, DVDs, network mounted drives, files, directories, services, media, documents, Web pages, objects, programs, email, etc.

To implement this process, resource access system 20 includes: an invocation system 22 having a resource inventory system 23 and a rendering system 24; a resource interaction system 26 having a VU interface 27 and a transport system (or facility) 26; and a resource manager 28. Note that in this illustrative embodiment, components of resource access system 20 are shown residing within VU server system 10. However, it is understood that some or all of these modules may be implemented locally by VU client 38.

Invocation system 22 allows the user 32 to initiate the resource access process within the virtual universe 18. Invocation system 22 may for example be initiated by selecting an action from a menu, selecting an item from the avatar's inventory, selecting an object rendered within the virtual universe 18, entering a room within the virtual universe 18, etc. In this illustrative embodiment, invocation system 22 includes a resource inventory system 23 for identifying available resources 34 from the client computer 36. Inventory may be determined and or held in any manner. For instance, inventory data may be cached by the VU client 38, be obtained dynamically from the local OS 40, etc.

Also included is a rendering system 24 that generates renderings of client computer resources 34 in the virtual universe 18. Rendering embodiments may vary, however a typical embodiment would render each accessible resource in a manner that one skilled in the art of computer usage could identify as representing the resource. For example, a disk drive could be rendered as a boxed shaped device with circular platters spinning, a directory could be rendered as a tree with subdirectories as branches of the tree, a network drive could be rendered as a boxed shaped devices with circular platters spinning and a wire entering one side of the boxed shape device, etc. In addition, such renderings may comprise categories of resources, such as that described below with regard to FIG. 2.

Resource interaction system 26 provides a mechanism for navigating, exploring, manipulating and transporting resources 34 via a user's avatar in the virtual universe 18. Resource interaction system 26 may allow any type of interaction with resources 34 that are typically permitted by local OS 40. Examples include the ability to delete or modify files, the ability to load programs from the virtual universe 18 to the client computer 36, the ability to navigate subdirectories, the ability to view thumbnails and/or other details of resources 34, the ability to run executable code, etc.

Resource interaction system 26 includes a VU interface 27 that allows the user's avatar the ability to interact with the rendered resources using avatar controls, including the use of pointing devices, keyboard commands, etc. Rendered resources behave as other rendered objects do within the virtual universe 18. Such behaviors include, e.g., having context menus, having the ability to be selected, responding to the laws of physics prevalent within that virtual universe 18 (objects should fall when dropped, etc.). Also included is a transport system 29 for transporting resources between virtual universe 18 and client computer 36. Any type of transport protocol may be used to transfer resources between the two.

As noted, any type of interaction with resources within the virtual universe 18 is possible. Illustrative interactions include the following:

(1) In the virtual universe 18, a rendering of a file can be dragged by an avatar from a disk drive rendering into the avatar's inventory. That file and its contents are then transported to the virtual universe 18 and made available when removed from the avatar's inventory.

(2) In the virtual universe 18, a rendering of a file can be dragged from a disk drive resource into a trash compactor. That resource is then placed into the local OS's disposal system (e.g., recycling bin, trash can, shredder, etc.) for future or immediate expunging from the physical resource at the operating systems discretion.

(3) In the virtual universe 18, an executable resource can be executed via an avatar interaction with the resource. The application/executable is then run on the client computer 36.

(4) A service (e.g., http server, defragmentation service, etc.) can be dragged onto the red part of a rendered stop light. The Local OS 40 on the client computer 36 then stops that service.

It should be appreciated that the above interactions are only illustrative and are not intended to assert or imply any limitation with regard to the environments in which different embodiments may be implemented. Many modifications to the type, scope, or invocation of acceptable actions may be made.

Resource manager 28 manages acquired resources 34 downloaded by the avatar from client computer 36. Acquired resources may be made available to the user's avatar in any number of ways. For example, one embodiment may have resource manager 28 automatically place the acquired resources into the avatar's inventory. Another embodiment may prompt the user 32 for locations in the virtual universe 18 to locate the new resources. Yet still, a different embodiment may keep the items in a virtual knapsack and require the user 32 to remove items from the knapsack and place within the virtual universe 18 manually. When an acquired resource is made available in the virtual universe 18, resource manager 28 can assign the resource a unique identifier and store the resource in a virtual universe database 30.

Note also that newly discovered resources may be made available as they are discovered, such as new or reattached devices, or new or reconnected network resources, e.g., as may become established via the Universal Plug and Play (UPnP) architecture. For example, a newly connected Storage Area Network (SAN) device discovered by the user's OS may appear within the virtual universe, e.g., with user notification.

Although in the described embodiment the viewing of and interaction with rendered resources is restricted to the user, the user may grant permission to other users/avatars to view or interact with any of their rendered resources. Various security controls such as access control lists (ACL), authentication challenges, etc., may be implemented to protect the user from malicious or unwanted use. For example, a user may grant another user a time-limited ability to print a document to the user's printer or access the user's media player.

If the resource manager 28 temporarily holds the object pending acceptance in the virtual universe 18 and/or requires any resource modification for the virtual universe 18, the resource may be kept in temporary storage in the VU database 30.

Figure 2:
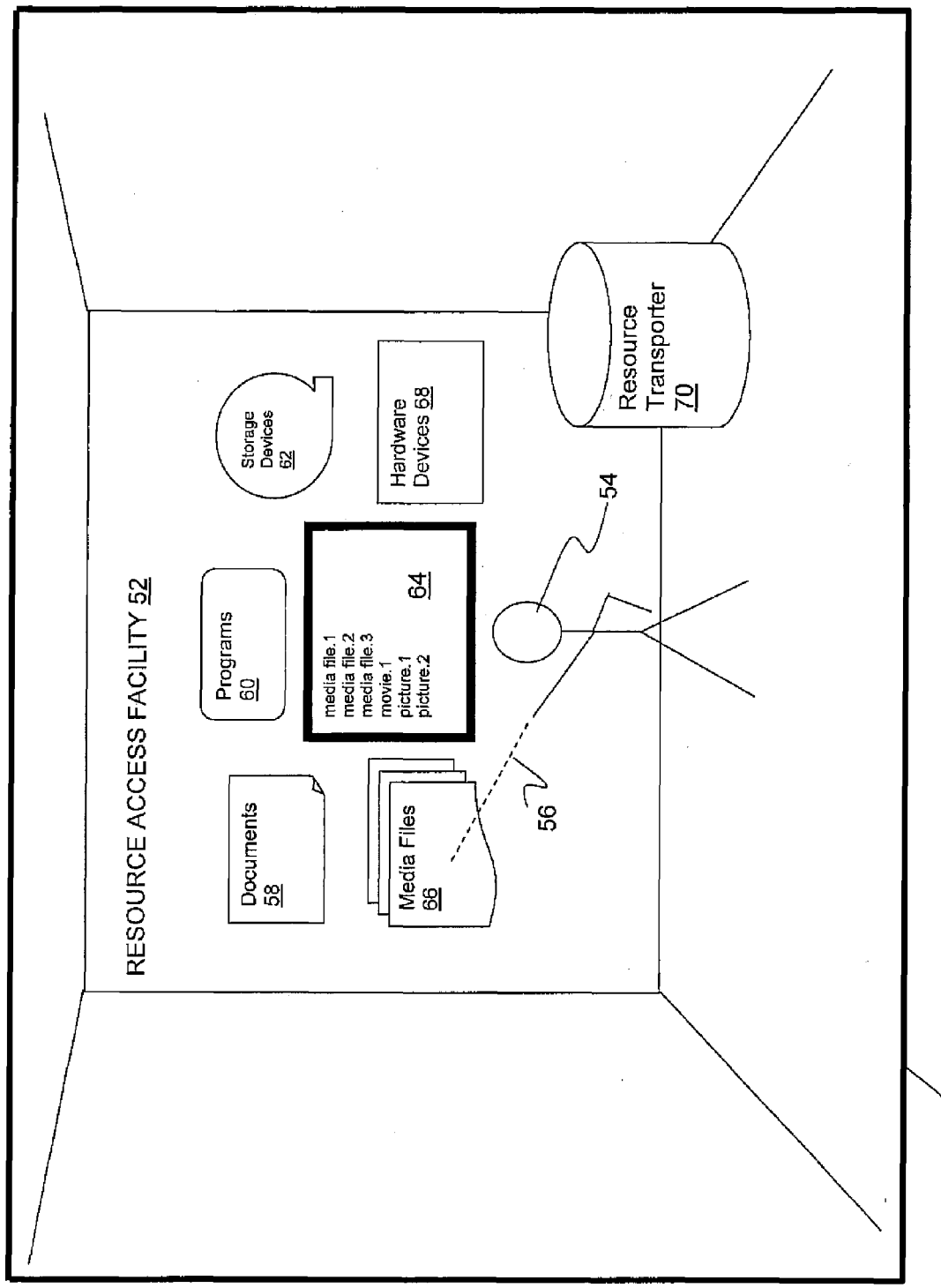
FIG. 2 depicts a room within a virtual universe for acquiring and manipulating resources on a local client computer in accordance with an embodiment of the present invention.

FIG. 2 depicts an illustrative embodiment of a virtual universe 18 having a resource access facility 52 for accessing resources from a user's client computer. In this illustrative embodiment, resource access facility 52 comprises a virtual room in which the user's avatar 54 can interact with resources from the client computer. It is understood that resource access facility 52 is but one type of interface that could be implemented in virtual world 18 to access resources from the client computer.

In this example, different categories of resources are rendered on a resource wall. Rendered categories include documents 58, programs 60, storage devices 62, media files 66, and hardware devices 68. In addition, a viewing screen 64 is provided for displaying additional details, sub-categories, directory structures, etc., when a category is selected by avatar 54. In this example, avatar 54 utilizes a pointer 56 to point to media files 66, which causes a list of resources to be displayed on viewing screen 64. If avatar 54 wanted to view additional details of a particular resource, avatar could select and open the resource on the viewing screen 64 (e.g., with the pointer, a drop down menu, a double click, etc.). A thumbnail image or the like could then be displayed on the viewing screen 64. Using avatar controls, avatar 54 can then manipulate (e.g., delete, copy, edit, move, enable, email, etc.) selected resources.

If there is a particular resource that the avatar wants to import into virtual world 18, the avatar could drag or "copy and paste" the listed resource to the resource transporter 70. Resource transporter 70 would then cause the resource to be loaded from the client computer into the virtual universe database. Resource transporter 70 can also be utilized to export resources from the virtual world 18 to the client computer. For instance, if the avatar purchased a song in the virtual universe 18, avatar 54 could upload the song to the client computer by taking the song out of the avatar's inventory and dropping it into the resource transporter 70.

Figure 3:
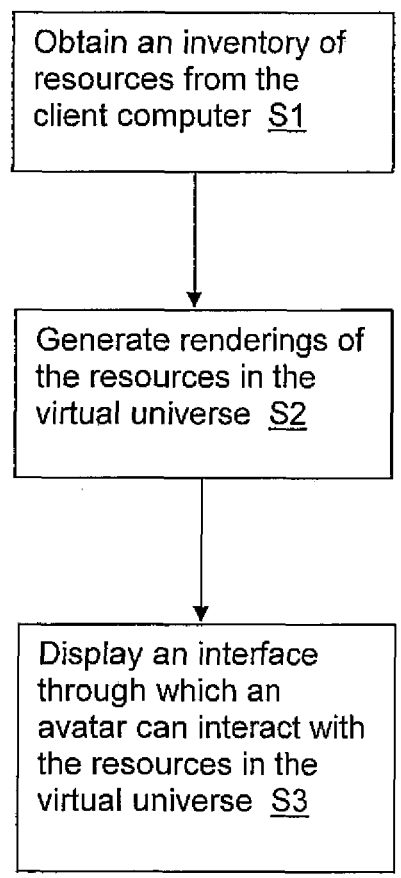
FIG. 3 depicts a flow diagram showing a method in accordance with an embodiment of the present invention.

FIG. 3 depicts a flow diagram of a method of the invention. At step S1, an inventory is obtained of resources from the client computer. At step S2, renderings are generated of the resources in the virtual universe. At step S3, an interface is displayed through which an avatar can interact with the resources in the virtual universe.

Referring again to FIG. 1, VU server system 10 is shown as including a processing unit 12, a memory 16, at least one input/output (I/O) interface 14, and a bus 17. Further, the VU server system 10 may also include other facilities such as external devices and storage systems. In general, the processing unit 12 executes computer program code, such as virtual universe 18, that is stored in memory 16. While executing computer program code, the processing unit 12 can read and/or write data from/to the memory 16, a storage system, and/or I/O interface(s) 14. Bus 17 provides a communication link between each of the components in the computer system 10. External device(s) can comprise any device (e.g., display) that enables a user 32 to interact with the VU server system 10 or any device that enables the VU server system 10 to communicate with one or more other computer systems. Client computer 36 may include similar features.

Both client computer 36 and VU server system 10 can comprise any general purpose computing article of manufacture capable of executing computer program code installed thereon (e.g., a personal computer, server, handheld device, etc.). However, it is understood that the VU server system 10 is only representative of various possible computer systems that may perform the various processes of the invention. To this extent, in other embodiments, the client computer 36 and VU server system 10 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the virtual world platform shown in FIG. 1 is only illustrative of various types of platforms that can be used to implement the present invention. For example, in an embodiment, the VU server system 10 can comprise two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that the various systems can be implemented independently, combined, and/or stored in memory for one or more separate computer systems that communicate over a network. Further, it is understood that some of the systems and/or functionality may not be implemented, or additional systems and/or functionality may be included as part of the invention.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 16 and/or a storage system (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a VU server system 10 that performs the processes of the invention for one or more customers. In return, the service provider can receive payment from the customer(s) under a subscription and/or fee agreement and/or the service provider can receive payment from the sale of advertising space to one or more third parties.

In still another embodiment, a virtual universe 18 can be obtained (e.g., created, maintained, having made available to, etc.) and one or more systems for performing the processes of the invention can be obtained (e.g., created, purchased, used, modified, etc.) and deployed. To this extent, the deployment of each system can comprise one or more of (1) installing program code on a client computer 36, from a computer-readable medium; (2) adding one or more computer systems to the computer infrastructure; and (3) incorporating and/or modifying one or more existing systems of a computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and many modifications and variations are possible.

What is claimed is:

1. A computer system for accessing resources on a client computer from within a virtual universe, comprising:
    at least one processing unit;
    memory operably associated with the at least one processing unit;
    a resource access system storable in memory and executable by the at least one processing unit, the resource access system comprising:
    computer program code for obtaining an inventory of resources from the client computer and generating renderings of the resources in the virtual universe, wherein the renderings of the resources are placed in an avatar inventory containing a listing of properties and possessions that are for use in the virtual universe and that belong to an avatar residing in the virtual universe;
    computer program code for managing resources acquired from the client computer, wherein the computer program code for managing the resources makes newly discovered resources available to the avatar in response to discovering the resources and notification to the avatar of the newly discovered resources, the newly discovered resources including new or reattached devices to the client computer, and new or reconnected resources to the client computer, and assigns acquired resources a unique identifier and loads the acquired resources into a virtual universe database; and
    computer program code for allowing the avatar to interact with the resources in the virtual universe, to view, modify, and run resources on the client computer, wherein the computer program code for allowing the avatar to interact with the resources provides a transport facility for loading resources from the client computer to the virtual universe, wherein the transport facility loads the resources into the avatar inventory, and an export facility for uploading resources from the virtual universe to the client computer.

2. The computer system of claim 1, further comprising a virtual universe client running on the client computer.

3. The computer system of claim 1, wherein the computer program code for allowing the avatar to interact with the resources allows a user in control of the avatar in the virtual universe to grant interaction privileges to avatars belonging to other users of the virtual universe.

4. A method for accessing resources on a client computer from within a virtual universe, comprising:
    obtaining an inventory of resources from the client computer;
    managing resources acquired from the client computer, wherein the managing of resources includes making newly discovered resources available to an avatar residing in the virtual universe in response to discovering the resources and notification to the avatar of the newly discovered resources, the newly discovered resources including new or reattached devices to the client computer, and new or reconnected resources to the client computer, and assigning acquired resources a unique identifier and loading the acquired resources into a virtual universe database;
    generating renderings of the resources in the virtual universe;
    placing the renderings of the resources in an avatar inventory containing a listing of properties and possessions that are for use in the virtual universe and that belong to the avatar residing in the virtual universe; and
    displaying an interface through which the avatar can interact with the resources in the virtual universe, to view, modify, and run resources on the client computer from within the virtual universe wherein the interface provides a transport facility for loading resources from the client computer to the virtual universe, wherein the transport facility loads the resources into the avatar inventory, and allows for uploading resources from the virtual universe to the client computer.

5. The method of claim 4, further comprising granting privileges to other avatars to interact with resources on the client computer from within the virtual universe.

6. A program product stored on a non-transitory computer readable medium for accessing resources on a client computer from within a virtual universe, comprising:
    program code for obtaining an inventory of resources from the client computer;
    program code for managing resources acquired from the client computer, wherein the program code for managing the resources makes newly discovered resources available to an avatar residing in the virtual universe in response to discovering the resources and notification to the avatar of the newly discovered resources, the newly discovered resources including new or reattached devices to the client computer, and new or reconnected resources to the client computer and assigning acquired resources a unique identifier and loading the acquired resources into a virtual universe database;

program code for generating renderings of the resources in the virtual universe;

program code for placing the renderings of the resources in an avatar inventory containing a listing of properties and possessions that are for use in the virtual universe and that belong to the avatar residing in the virtual universe; and program code for displaying an interface through which the avatar can interact with the resources in the virtual universe, to view, modify, and run resources on the client computer from within the virtual universe, wherein the interface provides a transport facility for loading resources from the client computer to the virtual universe, wherein the transport facility loads the resources into the avatar inventory, and allows for uploading resources from the virtual universe to the client computer.

7. The program product of claim 6, further comprising program code to grant privileges to other avatars to interact with resources on the client computer from within the virtual universe.

8. A method for deploying an application for accessing resources on a client computer from within a virtual universe, comprising:

providing a computer infrastructure to:

obtain an inventory of resources from the client computer;

manage resources acquired from the client computer, wherein the managing of resources makes newly discovered resources available to an avatar residing in the virtual universe in response to discovering the resources and notification to the avatar of the newly discovered resources, the newly discovered resources including new or reattached devices to the client computer, and new or reconnected resources to the client computer, and assigning acquired resources a unique identifier and loading the acquired resources into a virtual universe database;

generate renderings of the resources in the virtual universe;

place the renderings of the resources in an avatar inventory containing a listing of properties and possessions that are for use in the virtual universe and that belong to the avatar residing in the virtual universe; and display an interface through which the avatar can interact with the resources in the virtual universe, to view, modify, and run resources on the client computer from within the virtual universe wherein the interface provides a transport facility for loading resources from the client computer to the virtual universe, wherein the transport facility loads the resources into the avatar inventory, and allows for uploading resources from the virtual universe to the client computer.

* * * * *